US012798084B2

(12) United States Patent
Hasegawa et al.

(10) Patent No.: US 12,798,084 B2
(45) Date of Patent: Nov. 17, 2026

(54) OBJECT GRIPPING METHOD, STORAGE MEDIUM, AND OBJECT GRIPPING CONTROL DEVICE

(71) Applicant: HONDA MOTOR CO., LTD., Tokyo (JP)

(72) Inventors: Tadaaki Hasegawa, Wako (JP); Masanori Yoshihira, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 183 days.

(21) Appl. No.: 18/367,474

(22) Filed: Sep. 13, 2023

(65) Prior Publication Data

US 2024/0100692 A1 Mar. 28, 2024

(30) Foreign Application Priority Data

Sep. 28, 2022 (JP) ................................ 2022-154741

(51) Int. Cl.

*B25J 9/16* (2006.01)
*B25J 13/08* (2006.01)
*B25J 15/00* (2006.01)

(52) U.S. Cl.

CPC ........... *B25J 9/1612* (2013.01); *B25J 13/089* (2013.01); *B25J 15/0009* (2013.01)

(58) Field of Classification Search

None

See application file for complete search history.

(56) References Cited

U.S. PATENT DOCUMENTS

2008/0114491 A1* 5/2008 Takahashi .............. B25J 13/082 901/1
2010/0138039 A1* 6/2010 Moon .................. B25J 15/0009 700/245

(Continued)

FOREIGN PATENT DOCUMENTS

CN 114952836 8/2022
DE 102013113459 10/2014

(Continued)

OTHER PUBLICATIONS

Thomas Feix et al., "The GRASP Taxonomy of Human GraspTypes" IEEE Transactions on Human-Machine Systems, vol. 46, No. 1, Feb. 2016, IEEE, p. 66-77.

(Continued)

*Primary Examiner* — Adam R Mott
*Assistant Examiner* — Alan Lindsay Ostrow
(74) *Attorney, Agent, or Firm* — Amin, Turocy & Watson, LLP

(57) ABSTRACT

An object gripping method includes determining a gripping center coordinate system when gripping a target object assumed to be gripped by an end effector having a plurality of fingers for each of a plurality of gripping postures that are able to be taken by the end effector, determining an initial fingertip position from the determined gripping center coordinate system, instructing the end effector to grip the target object at the initial fingertip position and gripping the target object, fixing a fingertip position of the end effector with respect to the gripping center coordinate system, and determining an operation amount of the gripping center coordinate system according to a desired operation amount of the target object and operating the target object according to an operation of the gripping center coordinate system.

8 Claims, 11 Drawing Sheets

(56) References Cited

U.S. PATENT DOCUMENTS

| | | | | |
|---|---|---|---|---|
| 2010/0292842 | A1* | 11/2010 | Takahashi | B25J 15/0009 700/262 |
| 2014/0277742 | A1 | 9/2014 | Wells et al. | |
| 2019/0275678 | A1* | 9/2019 | Takeuchi | B25J 9/163 |
| 2022/0080581 | A1* | 3/2022 | Wang | B25J 19/023 |
| 2022/0402125 | A1* | 12/2022 | Moreno Noguer | B25J 9/161 |
| 2024/0109181 | A1* | 4/2024 | Wang | G06F 18/24147 |

FOREIGN PATENT DOCUMENTS

| | | | |
|---|---|---|---|
| JP | 2009-269127 | | 11/2009 |
| JP | 2010-264544 | | 11/2010 |
| JP | 2012-006097 | | 1/2012 |
| JP | 2012006097 | A * | 1/2012 |
| JP | 2015-066632 | | 4/2015 |
| WO | 2015/153739 | | 10/2015 |

OTHER PUBLICATIONS

Japanese Office Action for Japanese Patent Application No. 2022-154741 mailed Sep. 30, 2025.

* cited by examiner

OBJECT GRIPPING METHOD, STORAGE MEDIUM, AND OBJECT GRIPPING CONTROL DEVICE

CROSS-REFERENCE TO RELATED APPLICATION

Priority is claimed on Japanese Patent Application No. 2022-154741, filed Sep. 28, 2022, the content of which is incorporated herein by reference.

BACKGROUND OF THE INVENTION

Field of the Invention

The present invention relates to an object gripping method, a storage medium, and an object gripping control device.

Description of Related Art

A control method for estimating a state of a target object from an image captured by a camera attached to a head of a robot having an end effector, for example, and moving a wrist position obtained from the estimated state of the target object as a target when the robot is caused to perform a task has been proposed (see Patent Document 1, for example). In gripping work, for example, after gripping, a position of the gripped target object is operated as an end effector position, a fingertip position is fixed with respect to the target object, the fingertip position at a desired target object position is calculated, and the fingertip position is controlled toward such a position.

[Patent Document 1] Japanese Unexamined Patent Application, First Publication No. 2015-66632

SUMMARY OF THE INVENTION

In gripping work, for example, a target object is moved by a finger which first touches the target object, and it is difficult to take a posture with a large angular margin at the time of an operation in advance. In the gripping work, when there are restrictions on an action, it is difficult to move only a position or a posture of the target object while maintaining a geometry (a positional relationship and a force balance) of the gripping. Further, in the gripping work, when force balance is considered on the basis of a target object position, there is a possibility that passivity cannot be guaranteed due to a position measurement error or the like. However, with a technology described in Patent Document 1, these problems cannot be solved.

Aspects of the present invention have been made in view of the above problems, and an object thereof is to provide an object gripping method, a storage medium, and an object gripping control device capable of stably realizing a target object operation after gripping using a multi-degree-of-freedom hand, with robustness against a measurement error.

In order to solve the above problems and achieve the object, the present invention adopts the following aspects.

(1) An object gripping method according to an aspect of the present invention includes determining a gripping center coordinate system when gripping a target object assumed to be gripped by an end effector having a plurality of fingers for each of a plurality of gripping postures that are able to be taken by the end effector;

determining an initial fingertip position from the determined gripping center coordinate system; instructing the end effector to grip the target object at the initial fingertip position, and gripping the target object; fixing a fingertip position of the end effector with respect to the gripping center coordinate system; and determining an operation amount of the gripping center coordinate system according to a desired operation amount of the target object, and operating the target object according to an operation of the gripping center coordinate system.

(2) In the aspect (1), the gripping center coordinate system may be updated according to a position of the fingertip in a case in which the fingertip moves when the target object is operated.

(3) In the aspect (1), the initial fingertip position may be determined so that a variation of a gripping center coordinate system at the time of operating the target object is small.

(4) In any one of the aspects (1) to (3), when the target object is moved, the end effector may be controlled using an integral value of a deviation between a measurement object position based on a measured posture of the target object and a goal object position serving as a goal position of a movement destination of the target object.

(5) In any one of the aspects (1) to (4), when the target object is gripped using three fingers among the plurality of fingers included in the end effector, a gripping center position in the gripping center coordinate system may be a center of a circumscribed circle of a triangle connecting fingertip centers of the plurality of fingers included in the end effector, or a centroid of the triangle connecting the fingertip centers of the plurality of fingers included in the end effector.

(6) In the aspect (5), the center of the circumscribed circle of the triangle connecting the fingertip centers of the plurality of fingers may be selected when a distance between an index finger and a middle finger included in the end effector is smaller than a predetermined distance, and the centroid of the triangle connecting the fingertip centers of the plurality of fingers may be selected when a distance between the index finger and the middle finger included in the end effector is larger than the predetermined distance.

(7) In any one of the aspects (1) to (6), a gripping center position in the gripping center coordinate system may be a center of a circumscribed circle of a right triangle formed by a perpendicular line of a palm reference point and a fingertip of an index finger when gripping is performed using the index finger among the plurality of fingers included in the end effector and a palm.

(8) A storage medium according to an aspect of the present invention stores a program causing a computer to execute: determining a gripping center coordinate system when gripping a target object assumed to be gripped by an end effector having a plurality of fingers for each of a plurality of gripping postures that are able to be taken by the end effector; determining an initial fingertip position from the determined gripping center coordinate system; instructing the end effector to grip the target object at the initial fingertip position, to thereby cause the end effector to grip the target object; fixing a fingertip position of the end effector with respect to the gripping center coordinate system; and determining an operation amount of the gripping center coordinate system according to a desired operation amount of the target object, and operating the target object according to an operation of the gripping center coordinate system.

(9) An object gripping control device according to an aspect of the present invention includes: a real position correction unit configured to determine a gripping center coordinate system when gripping a target object assumed to be gripped by an end effector having a plurality of fingers for each of a plurality of gripping postures that are able to be taken by the end effector, and determine an initial fingertip position from the determined gripping center coordinate system; and a hand control unit configured to instruct the end effector to grip the target object at the initial fingertip position, to thereby cause the end effector to grip the target object, fix a fingertip position of the end effector with respect to the gripping center coordinate system, determine an operation amount of the gripping center coordinate system according to a desired operation amount of the target object, and operate the target object according to an operation of the gripping center coordinate system.

According to the aspects (1) to (9), it is possible to stably realize a target object operation after gripping using a multi-degree-of-freedom hand, with robustness against a measurement error.

DETAILED DESCRIPTION OF THE INVENTION

Figure 1:
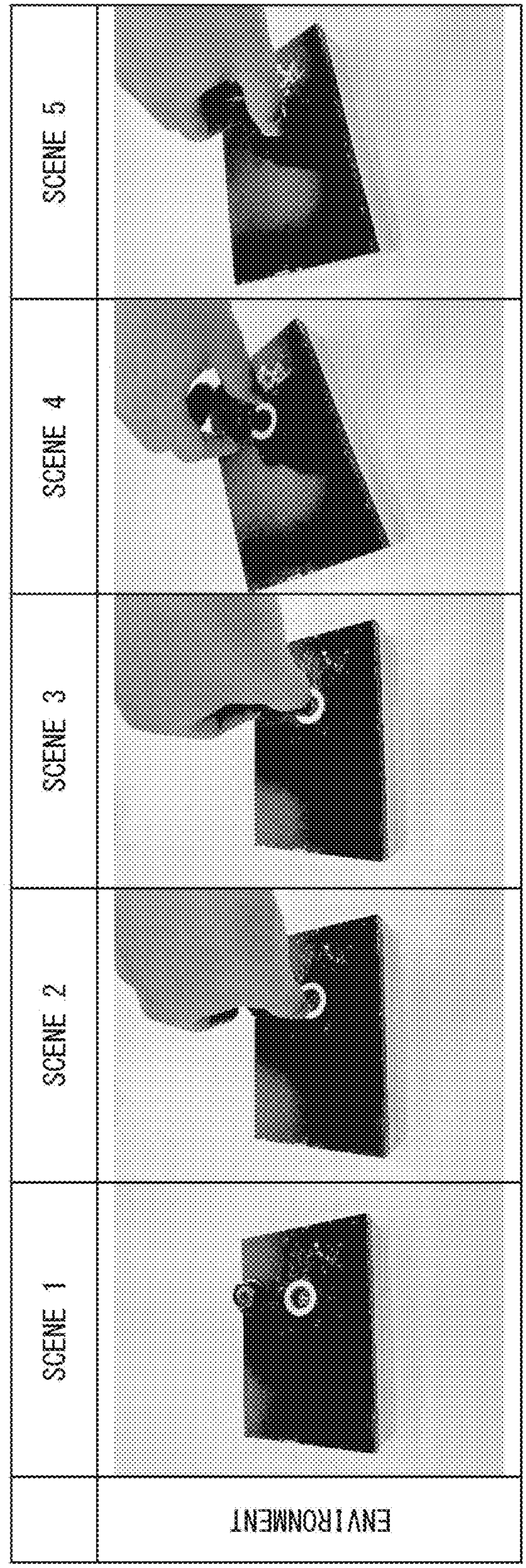
FIG. 1 is a diagram illustrating an example of a problem in a gripping action.

Hereinafter, embodiments of the present invention will be described with reference to the drawings. In the drawings used for the following description, a scale of each member is appropriately changed so that the member has a recognizable size.

In all drawings for describing the embodiments, components having the same functions are denoted by the same reference numerals, and repeated description thereof will be omitted.

"On the basis of XX" in the present application means "based on at least XX," and includes a case of being based on another element in addition to XX. "On the basis of XX" is not limited to a case in which XX is used directly, and also includes a case of being based on something obtained by performing calculation or processing on XX. "XX" is an arbitrary element (for example, arbitrary information).

Example of Problem in Gripping Action

First, an example of a problem in a gripping action will be described.

FIG. 1 is a diagram illustrating an example of a problem in the gripping action. The work illustrated in FIG. 1 is the work of screwing a hexagonal bolt into a screw hole.

Scene 1 is a work start state, and is a state in which a hexagonal screw is set near a screw hole and is extended.

Scene 2 is a state in which the hexagonal screw is about to be gripped. In this case, there is a problem that, for example, even when an imaging device is attached to a head of the robot, the hexagonal screw is blocked by the hand and a posture before gripping cannot be checked.

Scene 3 is a state in which the hexagonal screw is gripped and then moved to the screw hole. In this case, there is a problem that the screw is not inserted into the screw hole unless the screw is brought upright in the hand and brought close to the screw hole.

Scene 4 is a state in which the hexagonal screw is inserted into the screw hole and the screw tightening is performed. In this case, there is a problem that the screw cannot be manually turned and tightened unless the finger is moved to roll a contact point with respect to a screw center.

Scene 5 is a state in which screw tightening is performed.

The task or problem illustrated in FIG. 1 is an example and the present invention is not limited thereto.

In gripping work, there are also the following problems, in addition to the above problem.

1. A target object is moved by a finger which first touches the target object.

2. It is difficult to take a posture with a large angular margin at the time of an operation in advance.

3. When there are restrictions on an action, it is difficult to move only a position or a posture of the target object while maintaining a geometry (a positional relationship and a force balance) of the gripping.

4. Considering force balance based on the position of the target object, there is a possibility that passivity cannot be guaranteed due to a position measurement error or the like.

[Taxonomy]

Next, an overview of classification of gripping postures (taxonomy) of a person will be described.

It is said that actions of a person regarding gripping or operating an object can be broadly divided into three aspects including order in which parts are gripped, object gripping, and object operation. A finger shape in this case is selected depending on a geometry of the object or a task after gripping.

In object gripping or operation, gripping is classified depending on a required task, or a distribution or size of a gripping record (see Reference 1, for example).

Figure 2:
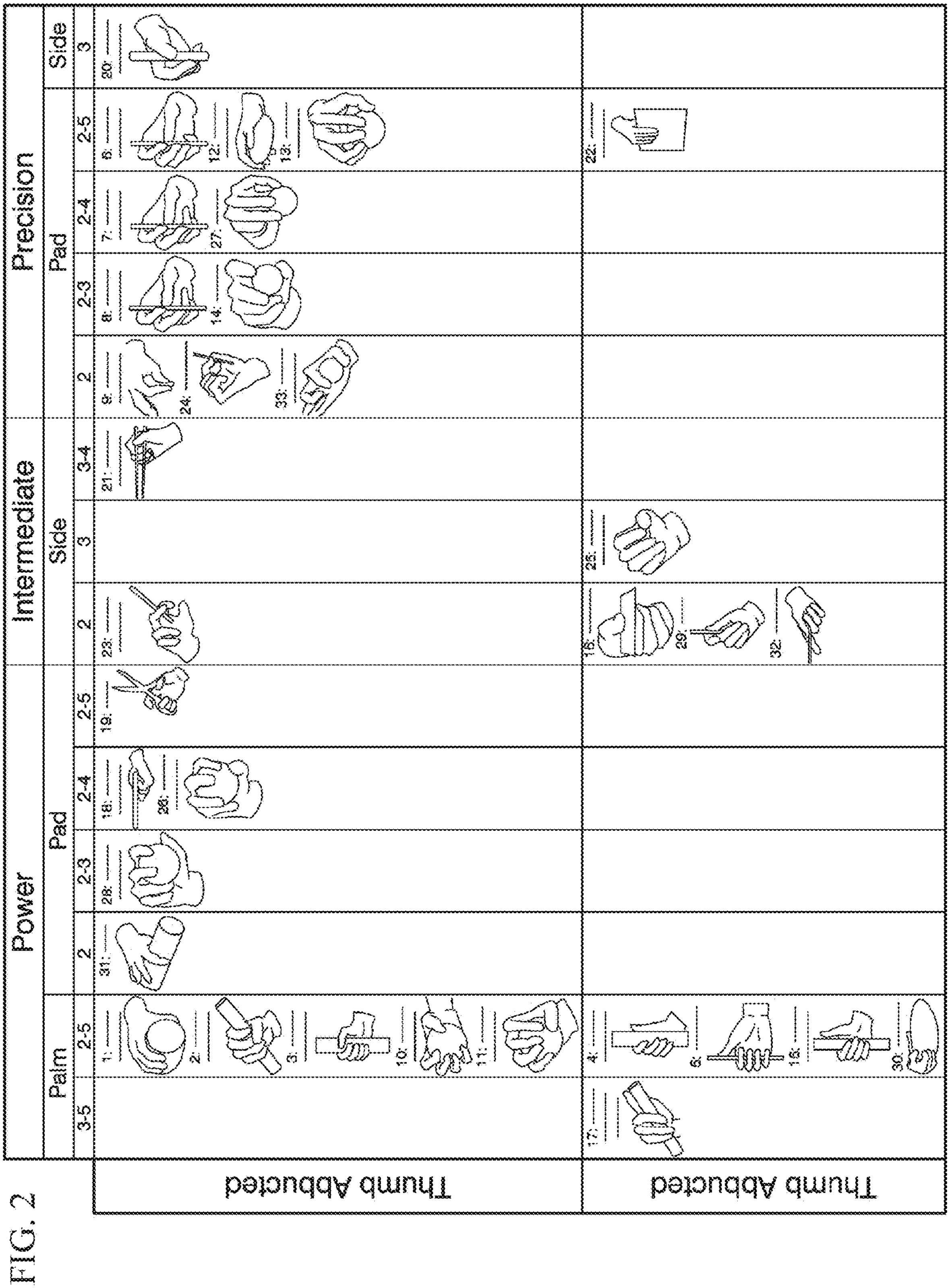
FIG. 2 is a diagram illustrating an example of classification of gripping depending on a GRASP classification method.

FIG. 2 is a diagram illustrating an example of classification of gripping depending on a GRASP classification method. As in FIG. 2, the classification of the gripping is performed in a column direction depending on assignment to power gripping, intermediate gripping, and precision gripping, an interpersonal relationship, and a virtual finger assignment. The column classification is performed depending on a position of a thumb, and the thumb is abducted or adducted.

The classification of gripping of the taxonomy illustrated in FIG. 2 is an example, and the present invention is not limited thereto.

Reference 1; Thomas Feix, Javier Romero, et al., "The GRASP Taxonomy of Human GraspTypes" IEEE Transactions on Human-Machine Systems (Volume: 46, Issue: 1, February2016), IEEE, p 66-77

Configuration Example of Object Gripping System

Next, a configuration example of an object gripping system will be described.

Figure 3:
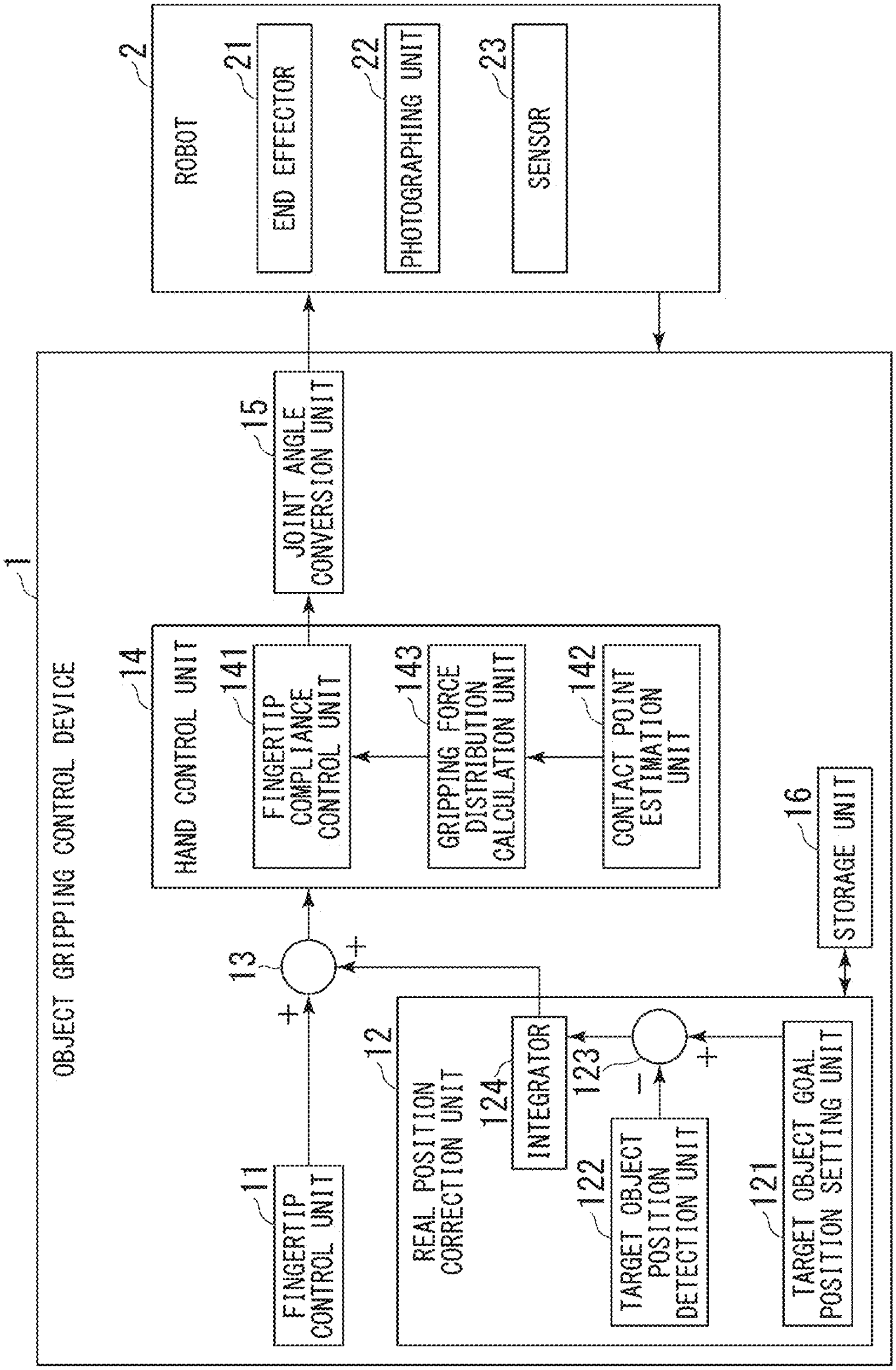
FIG. 3 is a diagram illustrating a configuration example of an object gripping system according to an embodiment.

FIG. 3 is a diagram illustrating a configuration example of the object gripping system according to the present embodiment. As illustrated in FIG. 3, the object gripping system includes an object gripping control device 1, and a robot 2.

The object gripping control device 1 includes, for example, a fingertip control unit 11, a real position correction unit 12, a calculation unit 13, a hand control unit 14, a joint angle conversion unit 15, and a storage unit 16.

The robot 2 includes an end effector 21, a photographing unit 22, and a sensor 23, for example.

An operator may remotely operate the robot 2. In such a case, the operator wears, for example, a head-mounted display (HMD) including a display device, a line-of-sight detection sensor, and the like on a head, and wears, for example, a data glove that detects a position or movement of the fingertips or the like on the hand. The end effector 21 is attached to an arm, for example, and has five fingers, for example. The number of fingers is not limited thereto, and may be four or the like. The end effector 21 includes actuators that move joints or fingers.

The photographing unit 22 includes, for example, an RGB sensor that captures an RGB (red-green-blue) image, and a depth sensor that captures a depth image including depth information. The photographing unit 22 is further attached to the head of the robot 2. Further, the photographing unit 22 may also be installed in a work environment.

The sensor 23 detects, for example, force of the fingertip and an angle of the fingertip.

The real position correction unit 12 corrects a real position on the basis of the image captured by the photographing unit 22 included in the hand (the end effector 21). The real position correction unit 12 determines the taxonomy on the basis of a joint angle, instruction content of the operator during execution, and the like. The real position correction unit 12 may perform acquisition from the image captured by the photographing unit 22 attached to the head of the robot 2, for example.

The real position correction unit 12 includes, for example, a target object goal position setting unit 121, a target object position detection unit 122, a calculation unit 123, and an integrator 124.

The target object goal position setting unit 121 sets a goal position of the target object using the image captured by the photographing unit 22 include in the hand. For example, when the target object is a screw, the goal position is a position of a hole that the screw enters, as illustrated in FIG. 1.

The target object position detection unit 122 recognizes the target object using the image captured by the photographing unit 22 included in the hand, and detects a position (including a posture) of the recognized target object.

The calculation unit 123 divides the position of the target object detected by the target object position detection unit 122 by the goal position set by the target object goal position setting unit 121 to correct real position information of the target object. In other words, the calculation unit 123 calculates a deviation between the goal object position and the target object position, as will be described below.

The integrator 124 integrates the deviation output by the calculation unit 123. The integrator 124 multiplies an integral value by a gain on the basis of information stored in the storage unit 16.

The storage unit 16 stores a gripping center coordinate system for each taxonomy. The storage unit 16 stores a predetermined gain. The storage unit 16 may store gains for each taxonomy, for example. The storage unit 16 stores a shape and a reference position (measurement object position) in association with each other for each gripping. The object gripping control device 1, for example, may measure a shape and weight of the target object on the basis of a position of each finger at the time of first gripping, and a detection value of the sensor 23 when the object has been gripped.

The fingertip control unit 11 acquires a command value from an operator who operates the robot 2. The fingertip control unit 11 refers to the acquired command value and the information stored in the storage unit 16 to generate a fingertip command value for controlling the fingertip at the time of an in-hand operation. A control method may be feedback (FB) control or feedforward (FF) control. The fingertip control unit 11 generates the fingertip command value according to a goal posture of the gripping target object. The fingertip control unit 11 corrects a goal fingertip position according to a goal movement amount of the gripping target object.

The calculation unit 13 adds the corrected real position information output by the real position correction unit 12 to the corrected goal fingertip position output by the fingertip control unit 11, and outputs a conversion result as the fingertip command value.

The hand control unit 14 controls the hand on the basis of the fingertip command value output by the calculation unit 13 and a fingertip force and finger angle information output by the robot 2. The hand control unit 14 includes, for example, a fingertip compliance control unit 141, a contact point estimation unit 142, and a gripping force distribution calculation unit 143.

The fingertip compliance control unit 141 performs fingertip compliance control of the end effector 21 on the basis of the fingertip command value output by the calculation unit 13 and a contact force command value output by the gripping force distribution calculation unit 143.

The contact point estimation unit 142 estimates a contact point between the finger and the target object on the basis of the fingertip force and the finger angle information output by the robot 2.

The gripping force distribution calculation unit 143 calculates a distribution of the gripping force to generate the contact force command value, on the basis of the estimated contact point information output by the contact point estimation unit 142.

The joint angle conversion unit 15 performs inverse kinematics calculation to generate a finger angle command value on the basis of the fingertip command value output by the hand control unit 14.

Configuration Example of End Effector

Next, a configuration example of the end effector will be described.

Figure 4:
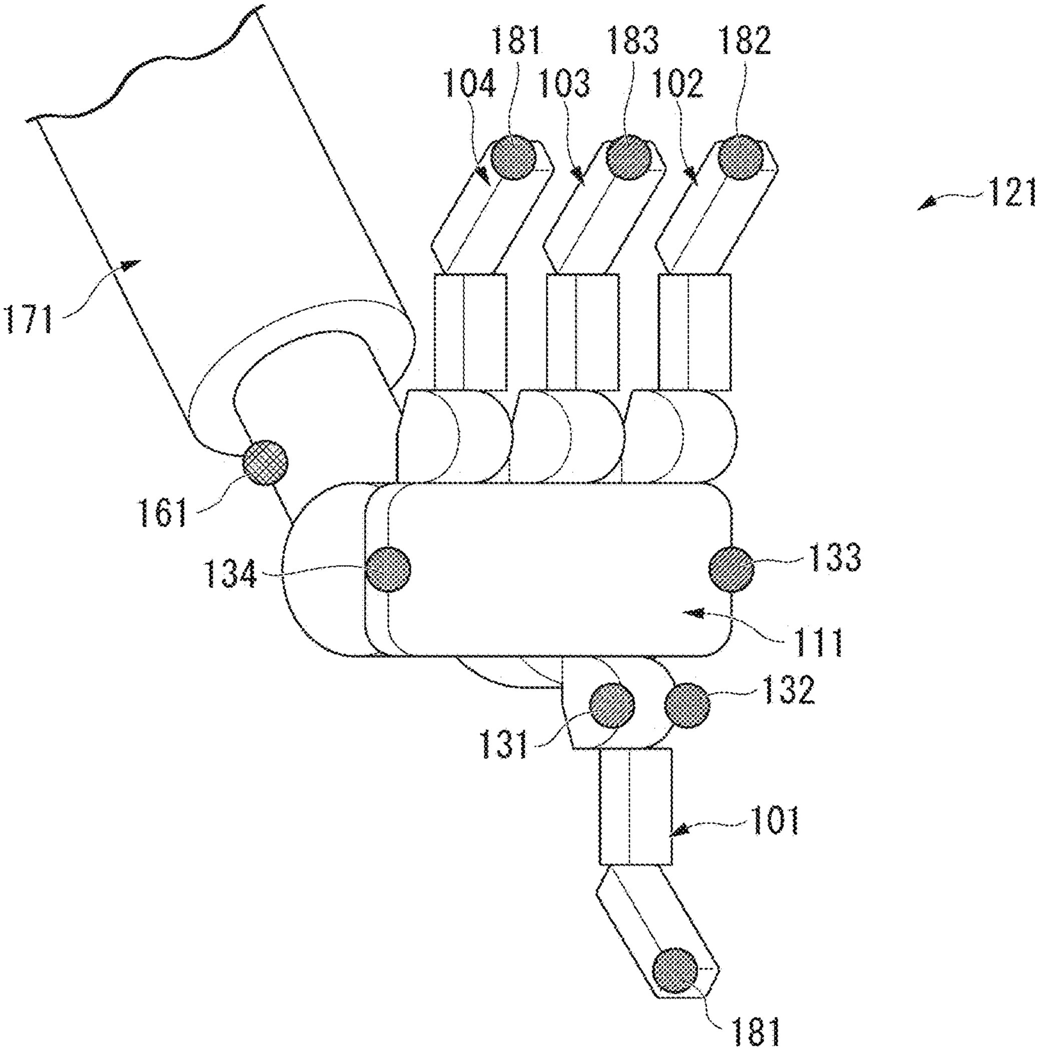
FIG. 4 is a diagram illustrating a configuration example of an end effector according to the embodiment.

FIG. 4 is a diagram illustrating a configuration example of the end effector according to the present embodiment. As illustrated in FIG. 4, the end effector 21 (hand) includes a finger portion 101, a finger portion 102, a finger portion 103, a finger portion 104, a base 111, a camera 131, a camera 132, a camera 133, a camera 134, a camera 181, a camera 182, a camera 183, a camera 184, and a camera 161. The end effector 21 is connected to an arm 171 that is a movement mechanism capable of moving a position of the end effector 21, via a joint. The configuration example of the end effector 21 and the number and positions of the cameras illustrated in FIG. 4 are merely examples, and are not limited thereto. For example, the number of fingers may be five.

The finger portion 101 includes a force sensor at a fingertip, for example. The finger portion 102 includes a force sensor at a fingertip, for example. The finger portion 103 includes a force sensor at a fingertip, for example. The finger portion 104 includes a force sensor at a fingertip, for example. The finger portion 101 corresponds to, for example, a thumb of the person, the finger portion 102 corresponds to, for example, the index finger of the person, the finger portion 103 corresponds to, for example, a middle finger of the person, and the finger portion 104 corresponds to, for example, a ring finger of the person. The arm 171 is also a mechanism portion that can change a wrist posture of the end effector 21.

The cameras 131 to 134, 181 to 184, and 161 are RDG-D cameras that can obtain RGB information and depth information. Alternatively, the cameras 181 to 184 may be a combination of a charge coupled device (CCD) imaging device, a complementary MOS (CMOS) imaging device, and a depth sensor, for example.

The camera 131 is installed, for example, at a position corresponding to a thumb ball of the person. The camera 131 may be installed, for example, at a position corresponding to the outer side rather than an index finger side of a base joint part of the thumb of the person.

The camera 132 is installed, for example, at a position corresponding to a thumb ball of the person. The camera 132 may be installed at a position corresponding to the index finger side of the base joint part of the thumb of the person.

The camera 133 is installed, for example, at a position corresponding to a side of four finger bases of the person on the thumb side, and sides of a thumb ball portion on the thumb and the index finger side.

The camera 134 is installed, for example, at a position corresponding to a side of the four finger bases of the person on the ring finger side, and a side of a little finger ball portion. The end effector 21 may include at least one of the cameras 131 to 134 on the palm.

The camera 181 is installed, for example, at a position corresponding to a fingertip of the thumb of the person. The camera 181 may be installed in a region including a fingertip, a distal joint portion, and a distal joint corresponding to the thumb of the person.

The camera 182 is installed, for example, at a position corresponding to a fingertip of the index finger of the person. The camera 182 may be installed in a region including a fingertip, a distal joint portion, and a distal joint corresponding to the index finger of the person.

The camera 183 is installed, for example, at a position corresponding to the fingertip of the middle finger or ring finger of the person. The camera 183 may be installed in a region including a fingertip, a distal joint portion, and a distal joint corresponding to the middle finger or ring finger of the person.

The camera 184 is installed, for example, at a position corresponding to a fingertip of the little finger or ring finger of the person. The camera 184 may be installed in a region including a fingertip, a distal joint portion, and a distal joint corresponding to the little finger or ring finger of the person.

The cameras 181 to 184 are installed near contact points of the fingers (places at which the finger portions touch the target object for a gripping purpose).

The camera 161 is installed, for example, at a position of the wrist.

6-axis sensors, position sensors, and the like are provided at the fingertips, joints, wrists, and the like. The fingertips include force sensors.

Definition of Terms in Embodiment

Here, a coordinate system, definitions of terms, and the like in the embodiment are performed.

1) A concept of the gripping center is called a coordinate system because there is not only a position but also an orientation.

2) Even when the gripping center is simply described, the gripping center is used in the sense of the gripping center coordinate system including an orientation.

In the present embodiment, the gripping center according to the gripping taxonomy is defined in conjunction with the fingertip position as follows.

3) The gripping center coordinate system is defined for each taxonomy. However, the gripping center coordinate system is only an ideal value. The gripping center coordinate system is used for a wrist position determination or initial posture calculation, but is not used thereafter.

4) The gripping center coordinates in 3) are finely adjusted according to an actual task, and the fingertip position is determined accordingly.

5) At an initial stage, an ideal (nominal) gripping center coordinate system set in 4) substantially matches a gripping center coordinate system calculated from the finger positions. However, each finger stops on a surface of the object depending on a shape of the target object, the finger deviates from an ideal position. Therefore, in control, the coordinate system calculated from the fingertip position is always used.

[Overview of Control Method]

In the present embodiment, for example, the following control is performed.

1. A gripping center position corresponding to a gripping taxonomy is defined in conjunction with the fingertip position, and an initial fingertip position is determined so that a variation of the position is minimized with respect to the movement of the fingertip. The initial fingertip position at this stage is a position when the hand is brought closer to the target object.

2. After the fingertip touches the target object, the fingertip position is set as the gripping center, that is, a balance center of the gripping force in the gripping center coordinate system, so that passivity can be maintained even when the fingertip moves. This makes it possible to ensure the passivity even when performing the operation, without hindering the contact according to the present embodiment by fixing the positions of the fingertips to the gripping center and performing a gripping center operation.

3. An operation amount of the gripping center is determined depending on a desired target object operation amount, so that the target object is operated without collapsing stable gripping.

4. A visual error captured by the photographing unit 22 is corrected through integral control.

Thus, when the position of the fingertip is determined, control is performed so that the gripping center position is determined. Therefore, even when the position of the target object or a change in the position cannot be observed from an image or the like, the gripping can be maintained. It is also possible to obtain positions to which the fingertips should be moved for gripping by determining the gripping center position first. Since the gripping center position is determined, it is possible to calculate the force for balancing each fingertip. Since the gripping center position is in the middle of the fingertip as will be described below, that is, the fingertip is disposed to oppose the gripping center in a well-balanced manner, control for returning can be performed even when there is a disturbance. At the time of an operation, an operation amount is determined with a center of the operation set as the gripping center position so that the target object can be operated while stability is being maintained. Further, an error of a position of the gripping center is integrated so that a recognized error can be corrected.

A main processing procedure in the embodiment is as follows.

I. A gripping center coordinate system for each taxonomy determined in advance is called according to the task.

II. The gripping center coordinate system and the fingertip positions at an initial stage are calculated on the basis of I.

III. A command to grip at the fingertip position of II is issued, but since the actual gripping place may differ, and thus, the fingertip is fixed at the actual gripping place and the gripping center coordinate system is calculated again from there.

IV. After III, the fingertips do not move, and a relationship between the gripping center and the fingertip remains unchanged. When the object is operated, a movement occurs for each gripping center.

V. When the fingertips move during the operation (power grip, or the like), the operation is performed while updating the gripping center coordinate system each time.

Example of Method of Calculating Gripping Center Position

Next, an example of a method of calculating the gripping center position in the embodiment will be described.

(Precision Gripping)

First, a method of calculating the gripping center in the case of precision gripping with three or more fingers will be described.

Figure 5:
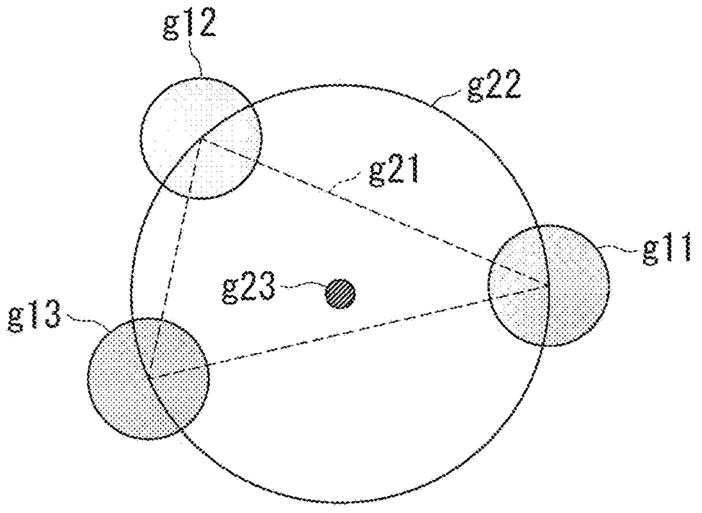
FIG. 5 is a diagram illustrating an example of a calculation method with a center of a circumscribed circle of a triangle connecting fingertip centers of three fingers in precision gripping set as a gripping center position.

FIG. 5 is a diagram illustrating an example of a calculation method with a center of a circumscribed circle of a triangle connecting the fingertip centers of three fingers in the precision gripping set as the gripping center position. In FIG. 5, a reference sign g11 indicates a thumb, a reference sign g12 indicates an index finger, and a reference sign g13 indicates a middle finger. A reference sign g21 indicates a triangle connecting fingertip centers of the three fingers, a reference sign g22 indicates a circumscribed circle of the triangle g21, and a reference sign g23 indicates a center of circumscribed circle g22. In this calculation scheme, when a distance between the index finger and the middle finger is small, a centroid of a gripping target matches the gripping center. However, with this calculation scheme, when the distance between the index finger and the middle finger is large, the triangle becomes large and goes out of the circumscribed circle, and there is a possibility that it will difficult to balance the forces.

Figure 6:
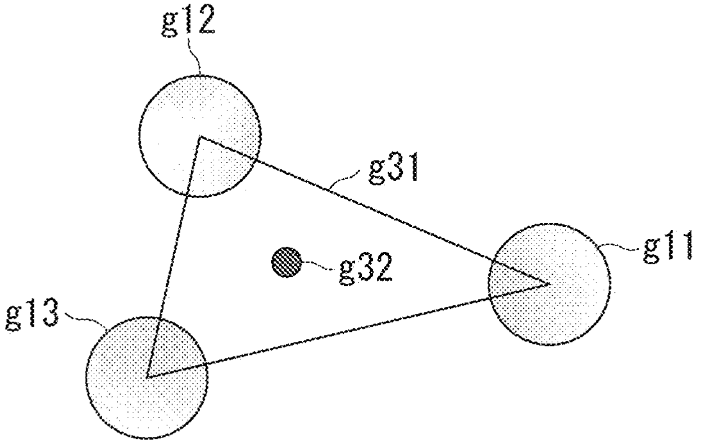
FIG. 6 is a diagram illustrating an example of a calculation method with a centroid of a triangle connecting the fingertip centers of three fingers in the precision gripping set as the gripping center position.

FIG. 6 is a diagram illustrating an example of a calculation method with a centroid of a triangle connecting the fingertip centers of three fingers in the precision gripping set as the gripping center position. In FIGS. 5 and 6, a state viewed from directly above or directly below when the target object is gripped is schematically shown.

A reference sign g31 represents a triangle connecting fingertip centers of the three fingers, and a reference sign g32 represents a centroid of the triangle g31. In this calculation scheme, when the triangle is an equilateral triangle, the centroid of the gripping target matches the gripping center, but when the triangle is another triangle, the centroid of the gripping target does not match the gripping center. However, the gripping center is always inside the triangle.

Each gripping center position described in FIGS. 5 and 6 is a three-dimensional position, although the gripping center position has been described using a two-dimensional gripping space diagram.

Therefore, in the present embodiment, the gripping center position in the precision gripping is calculated as a center position of the circumscribed circle when the distance between the index finger and the middle finger is small, and is obtained as a centroid position of the triangle when the distance between the index finger and the middle finger is large.

For example, when gripping is performed with four fingers, the three dominant fingers for gripping may be selected from among the four fingers on the basis of a taxonomy, for example, and the gripping center position may be determined on the basis of a triangle formed by the selected three fingers and a circumscribed circle of the triangle. Alternatively, when gripping is performed with the four fingers, the gripping center position may be determined on the basis of a polygon formed by the four fingers or a circumscribed circle of the polygon.

(Power Gripping)

Figure 7:
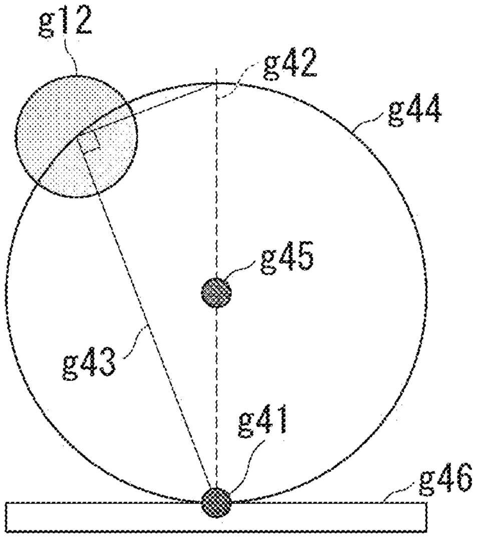
FIG. 7 is a diagram illustrating a method of calculating a gripping center in power gripping.

Next, a method of calculating the gripping center in the case of power gripping in which a palm is also used to grip will be described. FIG. 7 is a diagram illustrating a method of calculating the gripping center in the power gripping. In the power gripping, for example, the palm is also used to grip a plastic bottle or the like. In FIG. 7, a state viewed from the side is schematically illustrated. In the power gripping for gripping a target object such as a sphere or a cylinder, positions of the fingers do not face each other depending on a gripping state, and thus, a position of the index finger is used in the present embodiment.

A point g41 is a reference point of the palm. A point g45 is a center of a circumscribed circle g44 of an isosceles right triangle g43 formed by a perpendicular line g42 of the reference point g41 of the palm and the fingertip of the index finger. Thus, in the present embodiment, the gripping center in the power gripping is determined from the palm and the fingertip of the index finger. This makes it possible to continuously calculate the center position according to a size of the circle even when the position of the index finger is moved at the time of gripping.

A position of the reference point is a position closer to the index finger in the case of light-tool (power gripping of a light target object), and is a position closer to the thumb in the case of power-sphere (power grip of a sphere) or medium-wrap (power grip in a wrapping state).

[Robustness Against Deviation]

Here, the robustness against deviation when the gripping center position obtained by using a scheme of the present embodiment is used will be described. In the present embodiment, when the fingertips move at the time of operating the target object due to the correction of the fingertip control unit 11, the gripping center coordinate system is updated according to the positions of the fingertips.

Figure 8:
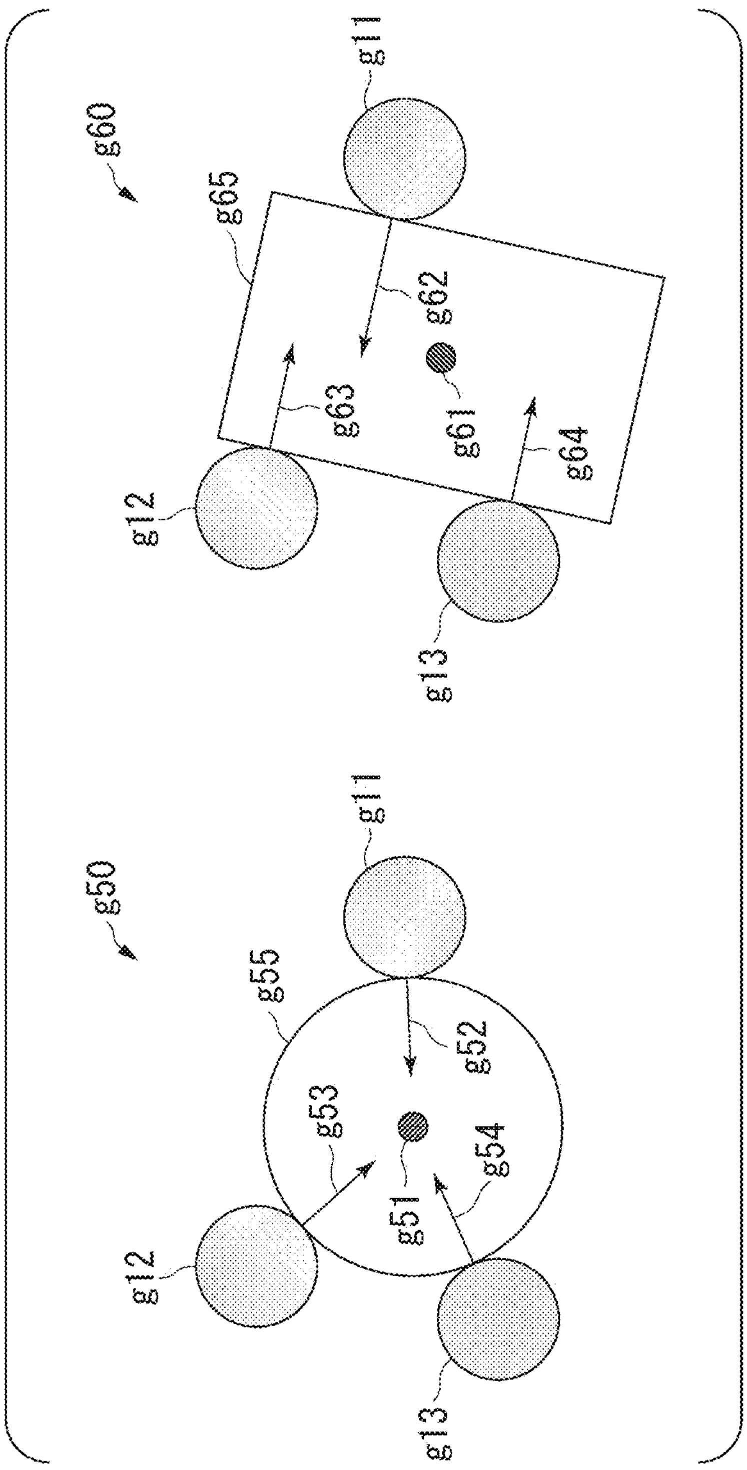
FIG. 8 is a diagram illustrating robustness against gripping target position deviation.

FIG. 8 is a diagram illustrating robustness against gripping target position deviation. When the gripping center position obtained as described above is set as a force balance point, forces satisfying the balance become forces g52 to g54 directed to a force balance point g51 as in an image g50, or become parallel forces g62 to g64 as in an image g60. That is, when force is applied to a target object g55 or g65 or when a position of the target object deviates, frictional force is passively generated at the fingertips at each position of the forces g52 to g54 or the forces g62 to g64 even when the gripping force is not controlled. Thus, according to the present embodiment, it is possible to maintain a balance with respect to the position deviation. According to the present embodiment, this makes it possible to realize robustness against disturbances.

[Switching Between Fingers]

Next, a case in which the gripping fingers are switched will be described.

Figure 9:
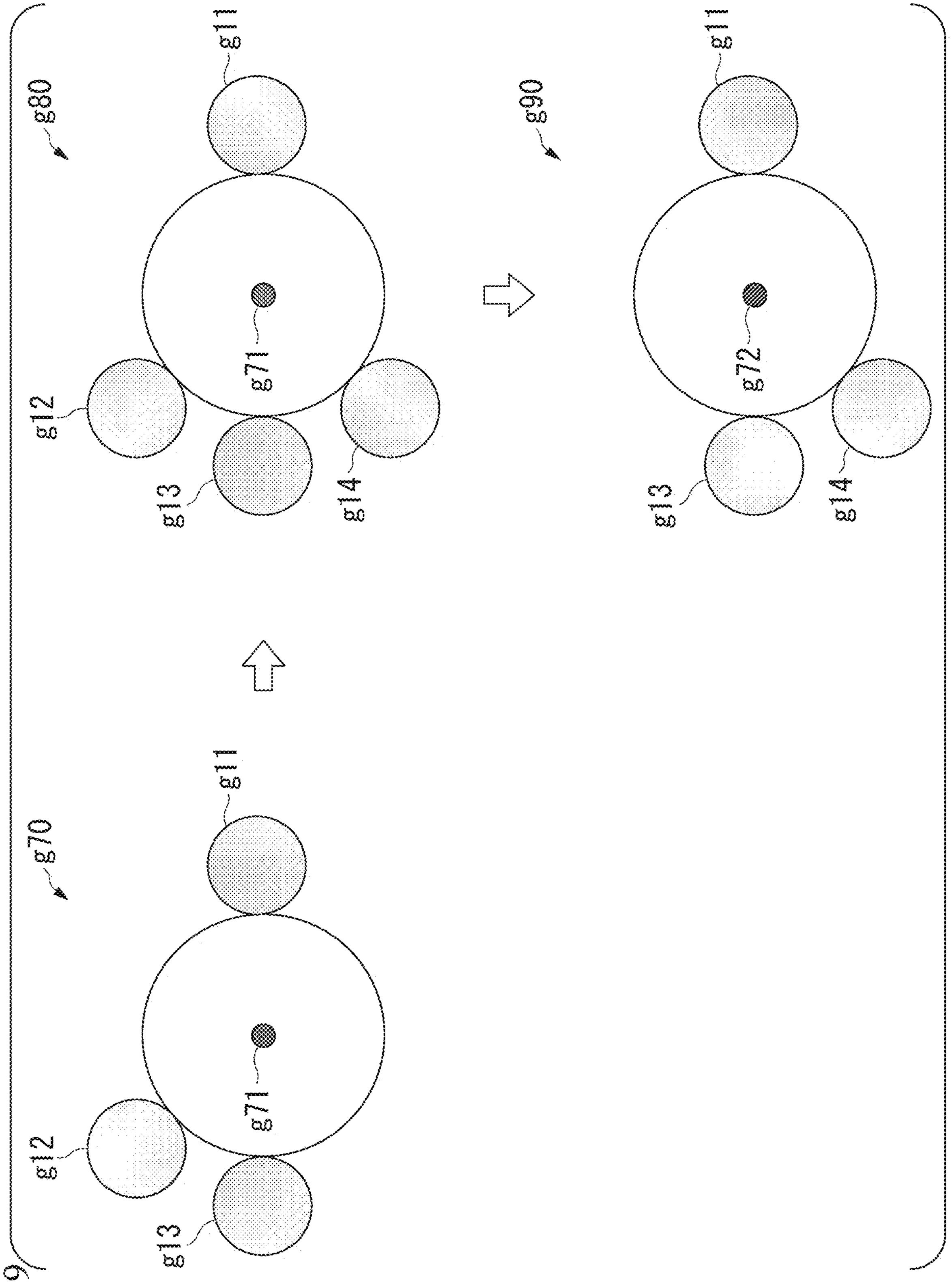
FIG. 9 is a diagram illustrating a case in which positions of fingers are switched.

FIG. 9 is a diagram illustrating a case in which fingers are switched. An image g70 is a state of being gripped by the thumb g11, the index finger g12, and the middle finger g13. An image g80 shows switching fingers, and shows a state of being gripped with the thumb g11, index finger g12, middle finger g13, and ring finger g14. An image g90 shows a situation after the fingers have been switched, and shows a state in which the index finger is released and gripping is performed with the thumb g11, the middle finger g13, and the ring finger g14.

In this case, a gripping center position g71 of the images g70 and g80 is a center position of a circumscribed circle of a triangle formed by the thumb g11, the index finger g12, and the middle finger g13, and a gripping center position g72 of the image g90 is a center position of the circumscribed circle of the triangle formed by the thumb g11, the middle finger g13, and the ring finger g14.

Thus, according to the present embodiment, even when the fingers are switched, the gripping center position according to the center of the circumscribed circle and the centroid of the triangle described above is subjected to weighted averaging, for example, according to a transition of the gripping force so that the finger can be continuously moved. That is, according to the present embodiment, the gripping center position is continuously changed so that a weight distribution becomes automatically small. According to the present embodiment, a force command can be set to 0 (zero) when internal force distribution is performed without involvement of the finger after the weight distribution becomes sufficiently small. According to the present embodiment, it is possible to release the fingers smoothly because of no involvement in the balance at this stage.

[Control of Gripping Target Position]

Next, control when a position of the gripping target deviates will be described.

Figure 10:
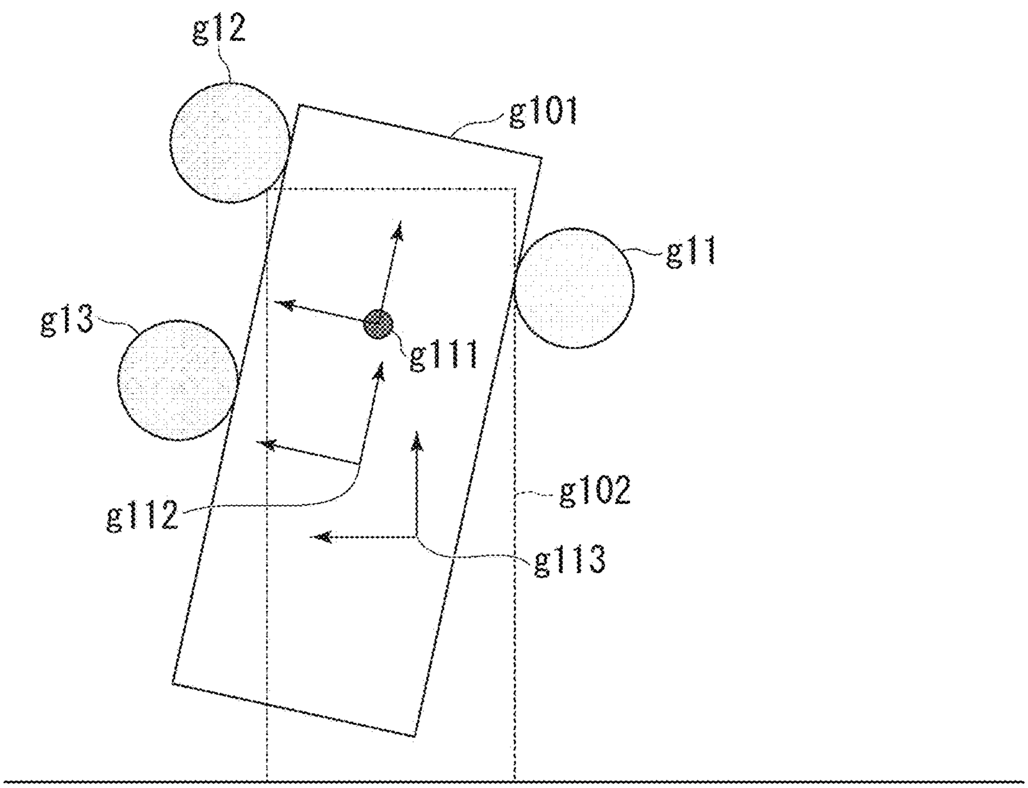
FIG. 10 is a diagram illustrating control when a position of the gripping target deviates according to the embodiment.

FIG. 10 is a diagram illustrating control when the position of the gripping target deviates according to the present embodiment. For example, a reference sign g101 is a state before the position of the target object deviates, and a reference sign g102 is a state after the position of the target object deviates. It is assumed that the target object has a cylindrical shape, for example.

FIG. 10 also illustrates control of gripping the target object from the side of the target object with three fingers and placing the target object on a floor. A gripping center position in the state of the reference sign g101 is a point g111. A point g112 is, for example, the position of the target object recognized from the image captured by the photographing unit 22, that is, a measurement object position. A point g113 is a goal object position in the state g102 in which the target object is placed on the floor.

In this case, the deviation of the position is a difference between the goal object position g113 and the measurement object position g112.

As described above, the gripping center position g111 is determined from the fingertip. The deviation between the gripping center position g111 and the measurement object position g112 can be calculated using measurement results. A relationship between the gripping center position and the measurement object position does not change in a period in which the target object is stably gripped. Therefore, when the deviation between the measurement object position and the goal object position is known, this may be converted into the gripping center position. Further, a relationship between the gripping center position and the fingertip does not change as long as the target object is stably gripped.

For example, the deviation of the position of the target object is expressed by the following equation (1).

[Math. 1]

$$\text{(Deviation of position of target object)}=\text{(goal object position)}-\text{(measurement object position)} \quad (1)$$

The gripping center position can be expressed as in the following equation (2). The gain is set in advance depending on, for example, a size, weight, taxonomy, or the like of the target object and stored in the storage unit 16.

[Math. 2]

$$\text{(gripping center position)}=\text{(integral value of deviation of position of target object)}\times\text{(gain)} \quad (2)$$

In the present embodiment, the gripping center position can be used as a fingertip position command.

This makes it possible to eliminate the position deviation of the target object while maintaining the stability of the target object and move the target object to a desired position while gripping the target object.

The fingertip control unit 11 performs the above-described calculation of the gripping center position. The real position correction unit 12 performs calculation of the deviation between the goal object position and the target object position.

Example of Control Procedure

Next, an example of a control processing procedure performed by the object gripping control device 1 will be described.

Figure 11:
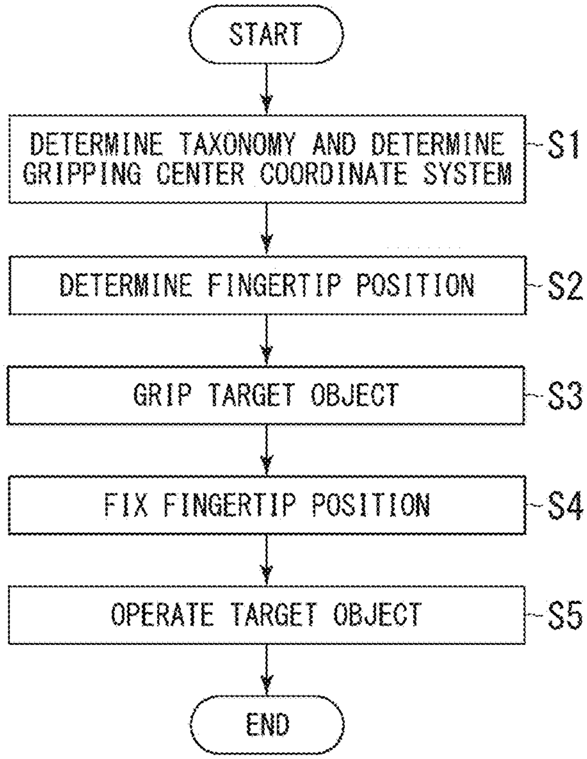
FIG. 11 is a flowchart of an example of a control processing procedure performed by an object gripping control device according to the embodiment.

FIG. 11 is a flowchart of an example of a gripping process procedure performed by the object gripping control device according to the present embodiment.

(Step S1) The fingertip control unit 11 acquires an operation instruction from the operator. The fingertip control unit 11 determines detection of the target object and the taxonomy on the basis of the image captured by the photographing unit 22, the information stored in the storage unit 16, and the acquired operation instruction. The object gripping control device 1 determines a gripping center coordinate system (the gripping center position and the orientation) when gripping a target object assumed to be gripped by the end effector 21 having a plurality of fingers for each of a plurality of gripping postures (taxonomies) that can be taken by the end effector 21. These pieces of information are stored in the storage unit 16 in advance, for example.

(Step S2) The fingertip control unit 11 determines the initial fingertip position on the basis of the acquired operation instruction, the determined taxonomy, and the gripping center coordinate system. That is, the fingertip control unit 11 determines the initial fingertip position from the acquired operation instruction and the information stored in the storage unit 16.

(Step S3) The hand control unit 14 instructs the end effector 21 to grip the target object from the initial fingertip position, for example, according to an operation of the operator or an autonomous operation, and grips the target object.

(Step S4) The hand control unit 14 fixes the fingertip position of the end effector 21 with respect to the gripping center coordinate system.

(Step S5) The hand control unit 14 determines an operation amount of the gripping center coordinate system according to a desired operation amount of the target object, and operates the target object according to an operation of the gripping center coordinate system.

The object gripping control device 1 repeats the above process to perform control of gripping of the target object, the balance of the target object after gripping, movement of the target object, movement of the fingertips, and the like.

Figure 12:
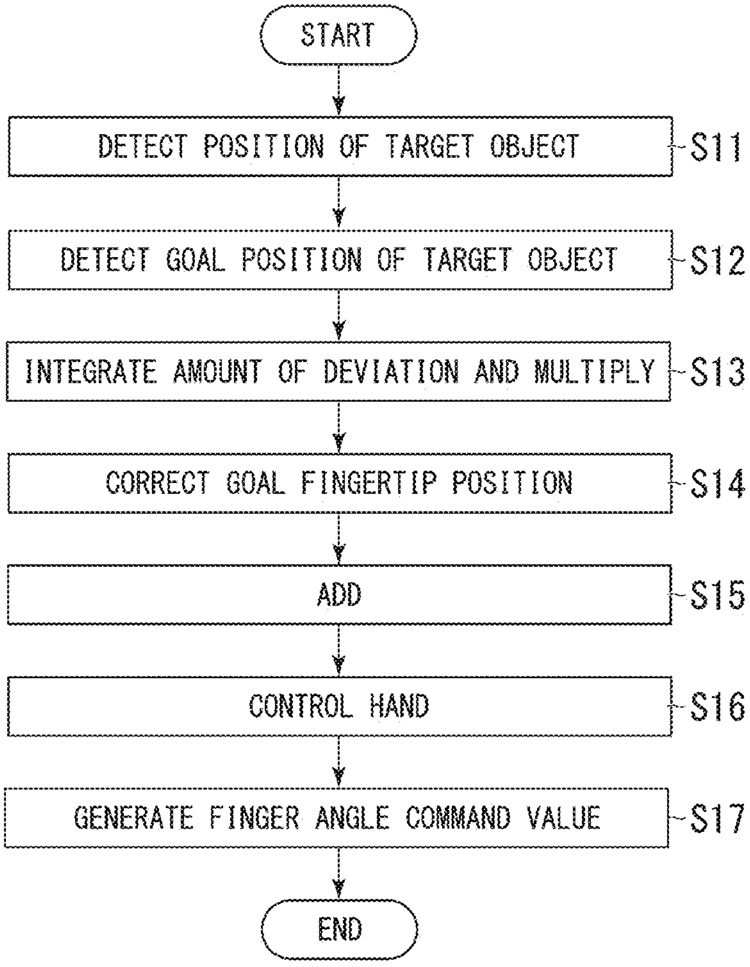
FIG. 12 is a flowchart of an example of a finger angle command value generation processing procedure performed by the object gripping control device according to the embodiment.

Next, an example of a finger angle command value generation processing procedure performed by the object gripping control device 1 will be described. FIG. 12 is a flowchart of an example of the finger angle command value generation processing procedure performed by the object gripping control device 1 according to the present embodiment.

(Step S11) The real position correction unit 12 uses the image captured by the photographing unit 22 to detect the position (measurement object position) and orientation of the target object.

(Step S12) The real position correction unit 12 uses the image captured by the photographing unit 22 to set the goal position (goal object position) and the orientation of the target object.

(Step S13) The real position correction unit 12 calculates an amount of deviation between the goal object position and the measurement object position. The real position correction unit 12 integrates the amount of deviation and multiplies a result thereof by the gain stored in the storage unit 16 to obtain the gripping center position.

(Step S14) The fingertip control unit 11 estimates the goal position and posture of the gripping center on the basis of the taxonomy. The fingertip control unit 11 corrects the goal fingertip position included in the acquired operation instruction according to the goal position and posture of the gripping center.

(Step S15) The calculation unit 13 adds the value output by the real position correction unit 12 to the value output by the fingertip control unit 11. For example, the calculation unit 13 performs coordinate transform of a relative movement amount to transform a change in the goal object position and posture into a change in the gripping center, and adds these together.

(Step S16) The hand control unit 14 controls the hand on the basis of the fingertip command value output by the calculation unit 13.

(Step S17) The joint angle conversion unit 15 performs inverse kinematics calculation to generate a finger angle command value on the basis of the fingertip command value output by the hand control unit 14.

The processing procedure illustrated in FIG. 12 is an example, and some of the processing may be performed in parallel or the processing procedures may be changed.

[Confirmation Results]

Figure 13:
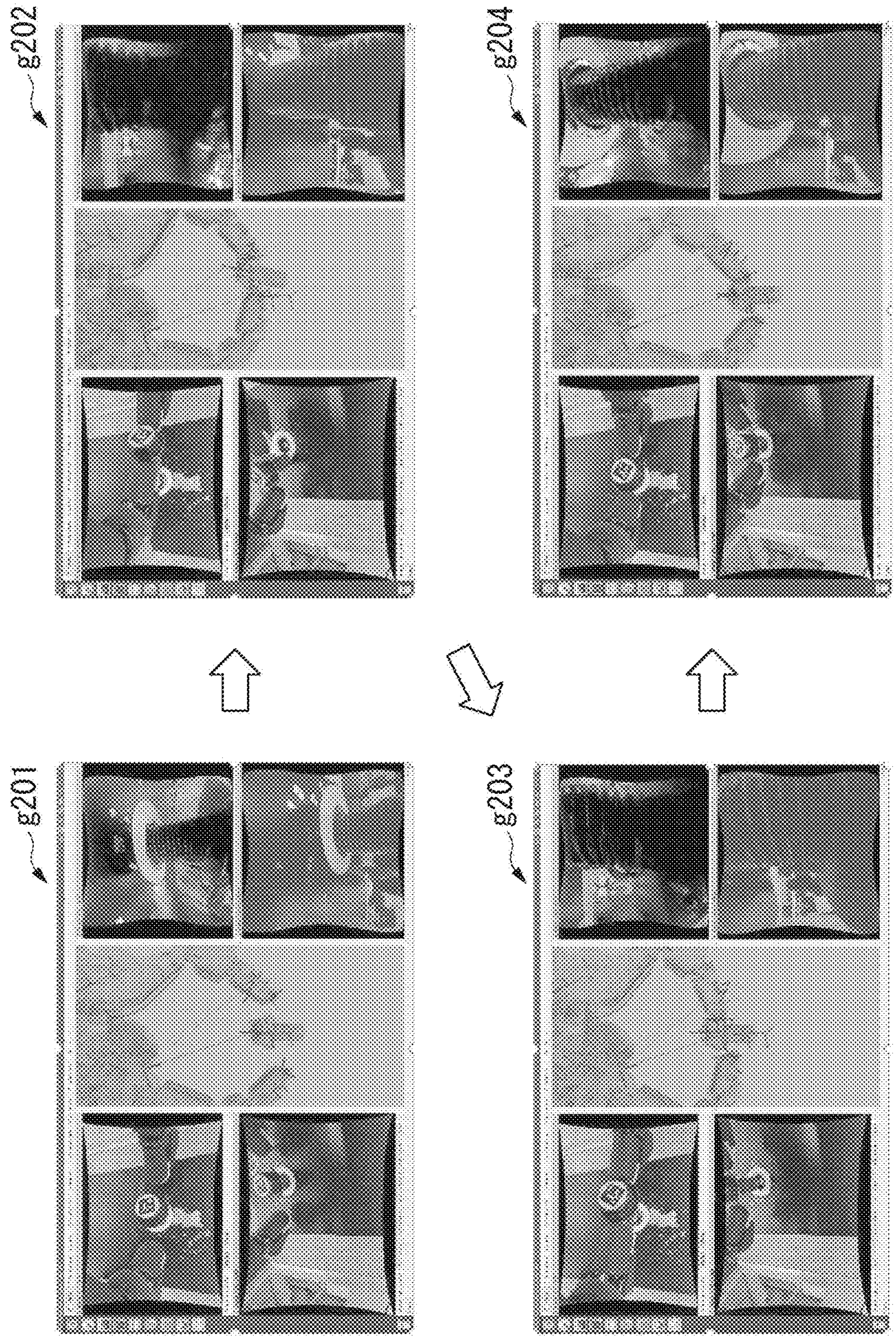
FIG. 13 is diagram illustrating a state in which a target object is gripped and work is performed according to a scheme of the embodiment.
Figure 14:
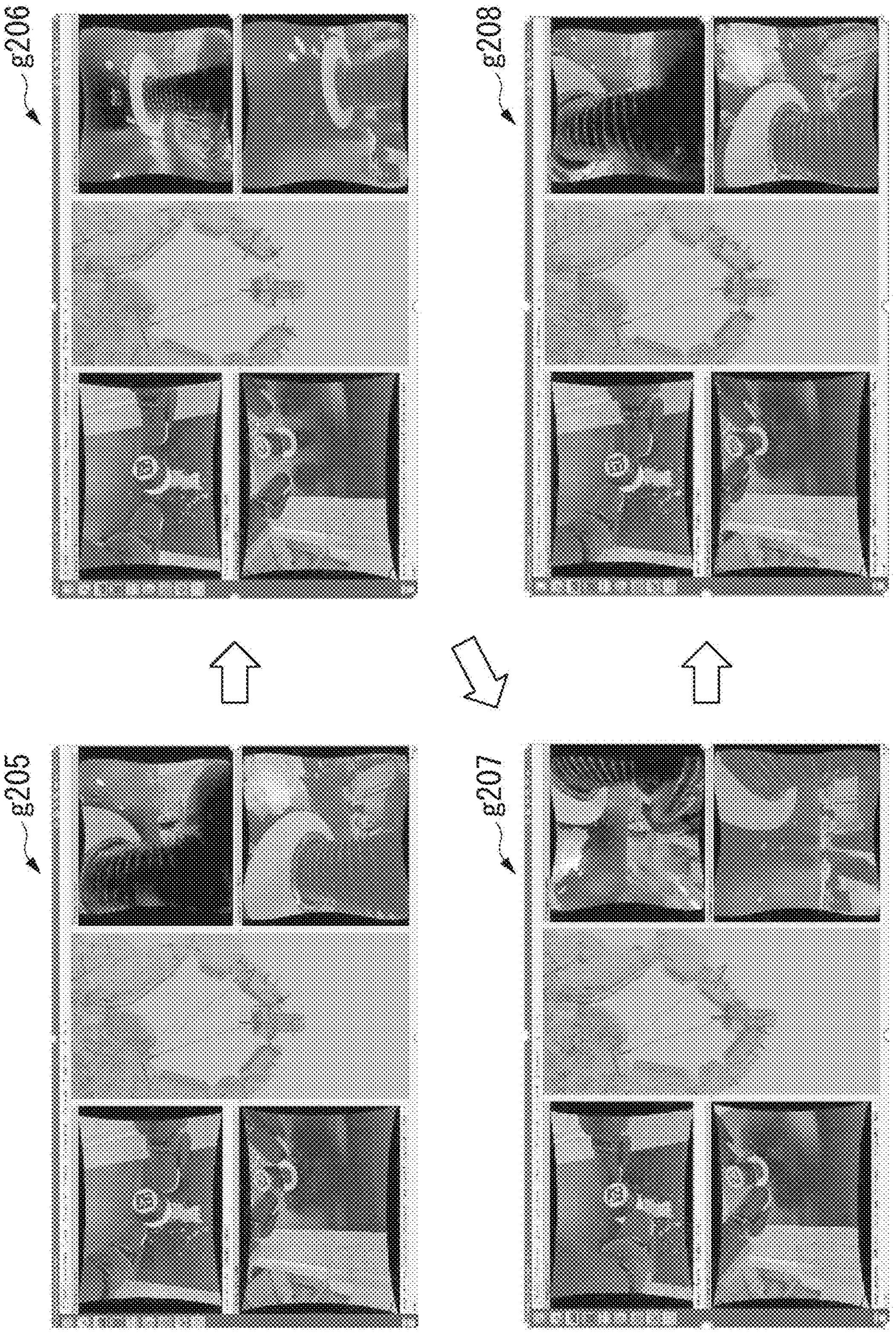
FIG. 14 is diagram illustrating a state in which the target object is gripped and the work is performed according to the scheme of the embodiment.

An example in which the robot 2 is caused to perform screw tightening work will be described with reference to FIGS. 13 and 14. FIG. 13 and FIG. 14 are diagrams illustrating a state in which a target object is gripped and the work is performed according to the scheme of the present embodiment. In images g201 to g208 in FIGS. 13 and 14, images on left, right, top, and bottom are images captured by the photographing unit 22 included in the hand, and a middle image indicates states of the fingers, the posture of the target object, and the like. In the middle images of FIGS. 13 and 14, respective arrows drawn on the target object and the fingertips indicate coordinates. A plurality of coordinates in the target object indicate the target object position and the goal object position.

In an initial state, a screw that is the target object is placed vertically (g201).

Next, the target object is gripped with fingertips. In this case, the posture (position) of the target object is tilted according to the fingertip grip positions (g202).

Next, the target object is moved to a screw hole while the position of the target object is being corrected (g203).

Next, the target object is inserted into the screw hole (g204).

Next, actions of the fingertips are controlled so that the screw is turned and the screw tightening work is performed (g205).

Next, the fingertips are removed from the target object in order to change angles or positions of the fingers to further perform screw tightening (g206).

Next, the target object is gripped with the fingertips again, and the target object is turned so that the screw tightening is performed (g207 and g208).

Then, the actions of g205 to g208 are repeated to perform the screw tightening work.

Thus, it was possible to realize changing a screw posture and to realize the insertion into the screw hole and tightening through control based on the gripping center position described above using the image obtained by the photographing unit 22 included in the hand photographing the hexagonal screw standing vertically near the screw hole in the confirmation.

With such control, according to the present embodiment, the gripping center position determined from the fingertips is obtained, and the balance of the object or a trajectory of the fingertip position is controlled with reference to the obtained gripping center position, enabling robust control and work against an error while performing continuous control.

A program for realizing some or all of functions of the object gripping control device 1 of the present invention may be recorded in a computer-readable recording medium, and the program recorded in this recording medium may be read into a computer system and executed to perform all or some of the processing performed by the object gripping control device 1. The "computer system" described herein includes an OS or hardware such as a peripheral device. Further, the "computer system" also includes a WWW system including a homepage providing environment (or display environment). Further, the "computer-readable recording medium" refers to a portable medium such as a flexible disk, a magneto-optical disc, a ROM, or a CD-ROM, or a storage device such as a hard disk built into the computer system. Further, the "computer-readable recording medium" may also include a recording medium that holds a program for a certain period of time, such as a volatile memory (RAM) inside a computer system including a server and a client when the program is transmitted over a network such as the Internet or a communication line such as a telephone line. Further, the program may be transmitted from a computer system in which the program is stored in a storage device or the like to another computer system via a transmission medium or by transmission waves in the transmission medium. Here, the "transmission medium" for transmitting the program refers to a medium having a function of transmitting information such as a network (a communication network) such as the Internet or a communication line such as a telephone line. Further, the program may be a program for realizing some of the above-described functions. Further, the program may be a so-called difference file (difference program) that can realize the above-described functions in combination with a program already recorded in a computer system.

Although a mode for carrying out the present invention has been described above using the embodiment, the present invention is not limited to the embodiment at all, and various modifications and substitutions can be made without departing from the gist of the present invention.

What is claimed is:

1. An object gripping method comprising:

defining a gripping center coordinate system for each of a plurality of gripping postures that are able to be taken by an end effector having a plurality of fingers, the gripping center coordinate system being defined in conjunction with a fingertip position of the end effector, and the gripping center coordinate system being defined for each taxonomy which is a classification of gripping postures of a person and including a gripping center which is a balance center of a gripping force of the end effector and an orientation of the end effector:

determining an initial fingertip position from the gripping center coordinate system when gripping a target object assumed to be gripped by the end effector;

instructing the end effector to grip the target object at the initial fingertip position, and gripping the target object;

setting the fingertip position of the end effector as the gripping center in the gripping center coordinate system after the fingertip touches the target object;

fixing a fingertip position of the end effector with respect to the gripping center coordinate system after gripping the target object;

determining an operation amount of the gripping center coordinate system according to a desired operation amount of the target object, and operating the target object according to an operation of the gripping center coordinate system; and updating the gripping center coordinate system according to a position of the fingertip in a case in which the fingertip moves when operating the target object.

2. The object gripping method according to claim 1, wherein the initial fingertip position is determined at a time of operating the target object so that a variation from the gripping center coordinate system is maximized.

3. The object gripping method according to claim 1, wherein, when the target object is moved, the end effector is controlled using an integral value of a deviation between a measurement object position based on a measured posture of the target object and a goal object position serving as a goal position of a movement destination of the target object.

4. The object gripping method according to claim 1, wherein, when the target object is gripped using three fingers among the plurality of fingers included in the end effector, a gripping center position in the gripping center coordinate system is a center of a circumscribed circle of a triangle connecting fingertip centers of the plurality of fingers included in the end effector, or a centroid of the triangle connecting the fingertip centers of the plurality of fingers included in the end effector.

5. An object gripping method comprising:

determining a gripping center coordinate system when gripping a target object assumed to be gripped by an end effector having a plurality of fingers for each of a plurality of gripping postures that are able to be taken by the end effector;

determining an initial fingertip position from the determined gripping center coordinate system;

instructing the end effector to grip the target object at the initial fingertip position, and gripping the target object;

fixing a fingertip position of the end effector with respect to the gripping center coordinate system; and determining an operation amount of the gripping center coordinate system according to a desired operation amount of the target object, and operating the target object according to an operation of the gripping center coordinate system, wherein, when the target object is gripped using three fingers among the plurality of fingers included in the end effector, a gripping center position in the gripping center coordinate system is a center of a circumscribed circle of a triangle connecting fingertip centers of the plurality of fingers included in the end effector, or a centroid of the triangle connecting the fingertip centers of the plurality of fingers included in the end effector, the object gripping method further comprising:

selecting the center of the circumscribed circle of the triangle connecting the fingertip centers of the plurality of fingers when a distance between an index finger and a middle finger included in the end effector is smaller than a predetermined distance, and selecting the centroid of the triangle connecting the fingertip centers of the plurality of fingers when a distance between the index finger and the middle finger included in the end effector is larger than the predetermined distance.

6. An object gripping method comprising:

determining a gripping center coordinate system when gripping a target object assumed to be gripped by an end effector having a plurality of fingers for each of a plurality of gripping postures that are able to be taken by the end effector;

determining an initial fingertip position from the determined gripping center coordinate system;

instructing the end effector to grip the target object at the initial fingertip position, and gripping the target object;

fixing a fingertip position of the end effector with respect to the gripping center coordinate system; and determining an operation amount of the gripping center coordinate system according to a desired operation amount of the target object, and operating the target object according to an operation of the gripping center coordinate system, wherein a gripping center position in the gripping center coordinate system is a center of a circumscribed circle of a right triangle formed by a perpendicular line of a palm reference point and a fingertip of an index finger when gripping is performed using the index finger among the plurality of fingers included in the end effector and a palm.

7. A computer-readable non-transitory storage medium having a program stored therein, the program causing a computer to execute:

defining a gripping center coordinate system for each of a plurality of gripping postures that are able to be taken by an end effector having a plurality of fingers, the gripping center coordinate system being defined in conjunction with a fingertip position of the end effector, and the gripping center coordinate system being defined for each taxonomy which is a classification of gripping postures of a person and including a gripping center which is a balance center of a gripping force of the end effector and an orientation of the end effector;

determining an initial fingertip position from the gripping center coordinate system when gripping a target object assumed to be gripped by the end effector;

instructing the end effector to grip the target object at the initial fingertip position, to thereby cause the end effector to grip the target object;

setting the fingertip position of the end effector as the gripping center in the gripping center coordinate system after the fingertip touches a target object;

fixing a fingertip position of the end effector with respect to the gripping center coordinate system after gripping the target object;

determining an operation amount of the gripping center coordinate system according to a desired operation amount of the target object, and operating the target object according to an operation of the gripping center coordinate system; and updating the gripping center coordinate system according to a position of the fingertip in a case in which the fingertip moves when operating the target object.

8. An object gripping control device comprising:

a processor configured to:

define a gripping center coordinate system for each of a plurality of gripping postures that are able to be taken by an end effector having a plurality of fingers, the gripping center coordinate system being defined in conjunction with a fingertip position of the end effector, and the gripping center coordinate system being defined for each taxonomy which is a classification of gripping postures of a person and including a gripping center which is a balance center of a gripping force of the end effector and an orientation of the end effector;

determine an initial fingertip position from the gripping center coordinate system when gripping a target object assumed to be gripped by the end effector; and instruct the end effector to grip the target object at the initial fingertip position, to thereby cause the end effector to grip the target object, fix a fingertip position of the end effector with respect to the gripping center coordinate system after gripping the target object, determine an operation amount of the gripping center coordinate system according to a desired operation amount of the target object, and operate the target object according to an operation of the gripping center coordinate system; and update the gripping center coordinate system according to a position of the fingertip in a case in which the fingertip moves when operating the target object.

* * * * *